(12) United States Patent
Uchiyama et al.

(10) Patent No.: US 10,809,053 B2
(45) Date of Patent: Oct. 20, 2020

(54) MOVEMENT ASSISTING DEVICE, MOVEMENT ASSISTING METHOD, AND COMPUTER PROGRAM PRODUCT

(71) Applicant: KABUSHIKI KAISHA TOSHIBA, Tokyo (JP)

(72) Inventors: Hideaki Uchiyama, Kanagawa (JP); Akihito Seki, Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 115 days.

(21) Appl. No.: 14/848,868

(22) Filed: Sep. 9, 2015

(65) Prior Publication Data

US 2016/0080644 A1 Mar. 17, 2016

(30) Foreign Application Priority Data

Sep. 17, 2014 (JP) .................................. 2014-189322

(51) Int. Cl.
*G06T 7/579* (2017.01)
*G01B 11/24* (2006.01)

(52) U.S. Cl.
CPC .............. *G01B 11/24* (2013.01); *G06T 7/579* (2017.01); *G06T 2200/24* (2013.01)

(58) Field of Classification Search
CPC ........... H04N 13/0014; H04N 13/0278; H04N 13/0011; H04N 13/0022; H04N 13/0404;
(Continued)

(56) References Cited

U.S. PATENT DOCUMENTS

| 2008/0304707 A1 | 12/2008 | Oi et al. |
| 2010/0102980 A1 | 4/2010 | Troy et al. |

(Continued)

FOREIGN PATENT DOCUMENTS

| JP | 2007-33087 A | 2/2007 |
| JP | 2008-304268 A | 12/2008 |

(Continued)

OTHER PUBLICATIONS

English-language machine translation of JP 2007-33087.
(Continued)

*Primary Examiner* — Dave Czekaj
*Assistant Examiner* — Samuel D Fereja
(74) *Attorney, Agent, or Firm* — Nixon & Vanderhye, P.C.

(57) ABSTRACT

A movement assisting device includes an imaging unit to take first and second images of an imaging unit from first and second viewpoints; a first calculator to calculate, using the first and second images, first position and orientation of the imaging unit at the first viewpoint and calculate second position and orientation of the imaging unit at the second viewpoint; a second calculator to calculate, using the first and second positions and the first and second orientations, and calculate a first angle between a first axis based on a first optical axis of the imaging unit at the first viewpoint, and a second axis based on a second optical axis at the second viewpoint; a third calculator to calculate the next viewpoint positioned in direction of increase of the first angle; and an output unit to output information prompting movement of the imaging unit in direction of the next viewpoint.

15 Claims, 12 Drawing Sheets

(58) Field of Classification Search
CPC ........... H04N 13/0468; H04N 13/0477; H04N 13/0018; H04N 5/23293; H04N 13/0239; H04N 13/0282; H04N 13/0402; H04N 13/0409; H04N 13/0429; H04N 13/0438; H04N 13/0048; H04N 13/0242; H04N 13/026; H04N 13/0434; H04N 13/0029; H04N 13/0207; H04N 13/021; H04N 13/0271; H04N 13/0296; H04N 13/0431; H04N 19/597; H04N 2013/0081; H04N 2209/047; H04N 2213/008; H04N 5/2258; H04N 5/23229

See application file for complete search history.

(56) References Cited

U.S. PATENT DOCUMENTS

| | | | |
|---|---|---|---|
| 2012/0002019 A1* | 1/2012 | Hashimoto | H04N 13/221 348/50 |
| 2012/0039511 A1 | 2/2012 | Oi et al. | |
| 2012/0321173 A1* | 12/2012 | Mitarai | G01B 11/03 382/154 |
| 2013/0044191 A1* | 2/2013 | Matsumoto | H04N 13/221 348/50 |
| 2013/0108108 A1* | 5/2013 | Oi | G06K 9/00664 382/103 |
| 2013/0321591 A1 | 12/2013 | Ohtomo et al. | |
| 2014/0327792 A1* | 11/2014 | Mulloni | G06T 7/73 348/211.8 |
| 2014/0334679 A1 | 11/2014 | Oi et al. | |
| 2015/0009211 A1* | 1/2015 | Jiang | G06T 19/00 345/419 |
| 2015/0062302 A1 | 3/2015 | Uchiyama et al. | |
| 2015/0077523 A1* | 3/2015 | Sato | H04N 13/0225 348/49 |
| 2015/0085273 A1 | 3/2015 | Itoh et al. | |
| 2015/0199850 A1* | 7/2015 | Uematsu | G06T 19/006 345/633 |
| 2015/0381968 A1* | 12/2015 | Arora | G06T 17/00 348/47 |

FOREIGN PATENT DOCUMENTS

| | | |
|---|---|---|
| JP | 2009-237848 | 10/2009 |
| JP | 2010-256253 | 11/2010 |
| JP | 2012-507011 A | 3/2012 |
| JP | 2013-246111 | 12/2013 |
| JP | 2014-006148 | 1/2014 |
| JP | 2015-049200 | 3/2015 |
| JP | 2015-059914 | 3/2015 |

OTHER PUBLICATIONS

Nister, David, "An Efficient Solution to the Five-Point Relative Pose Problem," IEEE Transactions on Pattern Analysis and Machine Intelligence, vol. 26, Issue 6, 2004, 15 pages.

* cited by examiner

MOVEMENT ASSISTING DEVICE, MOVEMENT ASSISTING METHOD, AND COMPUTER PROGRAM PRODUCT

CROSS-REFERENCE TO RELATED APPLICATION(S)

This application is based upon and claims the benefit of priority from Japanese Patent Application No. 2014-189322, filed on Sep. 17, 2014; the entire contents of which are incorporated herein by reference.

FIELD

Embodiments described herein relate generally to a movement assisting device, a movement assisting method, and a computer program product.

BACKGROUND

A technology called visual mono-SLAM (where SLAM stands for Simultaneous Localization and Mapping) is known in which an object is captured while changing the viewpoints by moving a monocular camera and, using a plurality of images taken from different viewpoints, the operation of calculating the three-dimensional position and the three-dimensional orientation of the object at each viewpoint and calculating the three-dimensional shape of the object is performed in a repeated manner so as to calculate a broad three-dimensional shape of the object.

For example, a technology in known in which, in order to inform the user about the next viewpoint for taking the next image, guidance is provided when the post-movement position of the imaging unit satisfies the condition for the next viewpoint.

However, in the conventional technology described above, unless the position of the imaging unit satisfies the condition for the next viewpoint, no guidance is provided. Hence, if the user has a low degree of proficiency and is not able to infer the position of the next viewpoint, he or she cannot determine the direction in which the imaging unit has to be moved to reach the next viewpoint. For that reason, no enhancement can be achieved in the work efficiency.

DETAILED DESCRIPTION

According to an embodiment, a movement assisting device includes an imaging unit, a first calculator, a second calculator, a third calculator, and an output unit. The imaging unit takes a first image of an object from a first viewpoint and takes a second image of the object after moving to a second viewpoint from the first viewpoint. The first calculator calculates, using the first image and the second image, a first position and a first orientation of the imaging unit at the first viewpoint and calculate a second position and a second orientation of the imaging unit at the second viewpoint. The second calculator calculates, by referring to the first position, the first orientation, the second position, and the second orientation, a first angle formed between a first axis and a second axis. The first axis is based on a first optical axis of the imaging unit at the first viewpoint. The second axis is based on a second optical axis of the imaging unit at the second viewpoint. The third calculator calculates a next viewpoint at which next imaging is to be performed and which is positioned in a direction of increase of the first angle, by rotating the second axis with reference to an intersection point of the first axis and the second axis. The output unit outputs information prompting movement of the imaging unit in a direction of the next viewpoint from the second viewpoint.

Various embodiments will be described below in detail with reference to the accompanying drawings.

First Embodiment

Figure 1:
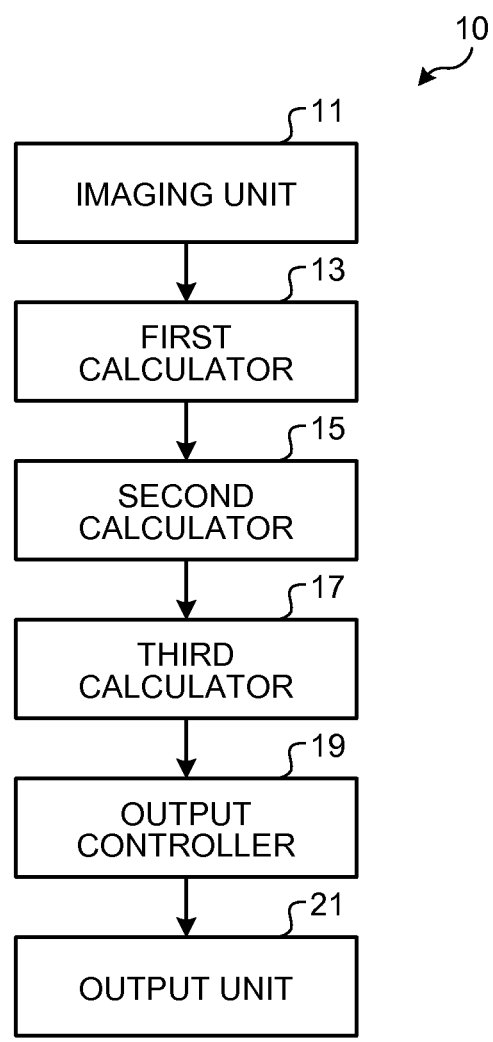
FIG. 1 is a configuration diagram illustrating an example of a movement assisting device according to a first embodiment.

FIG. 1 is a configuration diagram illustrating an example of a movement assisting device 10 according to a first embodiment. As illustrated in FIG. 1, the movement assisting device 10 includes an imaging unit 11, a first calculator 13, a second calculator 15, a third calculator 17, an output controller 19, and an output unit 21.

The imaging unit 11 can be implemented using, for example, an imaging device such as a monocular camera that has an image sensor made of a charge coupled device (CCD) or a complementary metal-oxide semiconductor (CMOS). The first calculator 13, the second calculator 15, the third calculator 17, and the output controller 19 can be implemented by making a processor such as a central processing unit (CPU) execute computer programs, that is, can be implemented using software; or can be implemented using hardware such as an integrated circuit (IC), or can be implemented using a combination of software and hardware. The output unit 21 can be implemented, for example, using a display device such as a liquid crystal display or a touch-sensitive panel display; or using a sound output device such as a speaker; or using a light emitting device such as a lamp or a light emitting diode (LED); or using a combination of such devices.

The movement assisting device 10 can be implemented in a measuring device in which an object is captured while changing the viewpoints by moving a monocular camera and the three-dimensional shape of the object is measured (calculated).

Figure 2:
FIG. 2 is a diagram illustrating an example of movement of an imaging unit according to the first embodiment.
Figure 2:
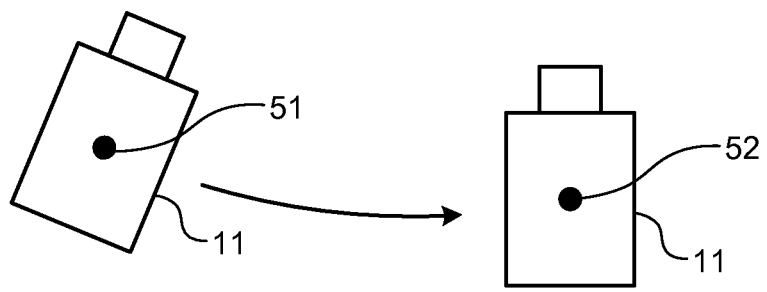

The imaging unit 11 is made to move by the user, and captures an object while changing the viewpoints. For example, as illustrated in FIG. 2, the imaging unit 11 captures a first image of an object 40 from a first viewpoint 51; moves to a second viewpoint 52 from the first viewpoint 51; and captures a second image of the object 40.

Every time the imaging unit 11 performs imaging from a new viewpoint, the first calculator 13 associates a plurality of images captured from different viewpoints by the imaging unit 11 (i.e., associates one or more images captured till the previous instance as well as associates the newly-captured image) with the feature points on the respective images, and calculates the three-dimensional position and the three-dimensional orientation of the imaging unit 11 at each viewpoint. As a result, the three-dimensional shape of that portion of the object which appears in a plurality of images is also measured (calculated). The method of measuring the three-dimensional shape is implemented using the Structure from motion technique.

For example, using the first image and the second image taken by the imaging unit 11, the first calculator 13 calculates a first position and a first orientation of the imaging unit 11 at the first viewpoint 51 as well as calculates a second position and a second orientation of the imaging unit 11 at the second viewpoint 52. In the first embodiment, the first position and the second position are assumed to be three-dimensional positions; while the first orientation and the second orientation are assumed to be three-dimensional orientations. However, that is not the only possible case.

More particularly, the first calculator 13 detects a plurality of first feature points from the first image; detects a plurality of second feature points from the second image; associates the first feature points in the first image with the second feature points in the second image; and thereby calculates the first position, the first orientation, the second position, and the second orientation.

The first feature points and the second feature points are points representing the features in the respective images. Examples of such feature points include pixels having characteristic local luminance variation in an image. Meanwhile, association of the first feature points and the second feature points is performed by associating the first feature points and the second feature points having a similar texture in the respective surrounding areas. Then, for example, the method written in David Nister, "An efficient solution to the five-point relative post problem", IEEE Transactions on Pattern Analysis and Machine Intelligence, Volume. 26, Issue. 6, pp. 756-770, 2004. can be implemented with respect to the first image and the second image having the first feature points and the second feature points associated with each other; and the first position, the first orientation, the second position, the second orientation, and the three-dimensional shape of that portion of the object 40 which appears in the first image as well as the second image can be calculated.

The second calculator 15 refers to the three-dimensional position and the three-dimensional orientation at each viewpoint as calculated by the first calculator 13, and calculates first angles formed between the axes that are based on the optical axes of the imaging unit 11 at the viewpoints. For example, the second calculator 15 refers to the first position, the first orientation, the second position, and the second orientation as calculated by the first calculator 13, and calculates a first angle formed between a first axis, which is based on a first optical axis of the imaging unit 11 at the first viewpoint 51, and a second axis, which is based on a second optical axis of the imaging unit 11 at the second viewpoint 52.

An optical axis represents a straight line that passes though the focal point from the optical center of the imaging unit 11, and is obtained when the three-dimensional position and the three-dimensional orientation of the imaging unit 11 at a particular viewpoint are calculated.

Figure 3:
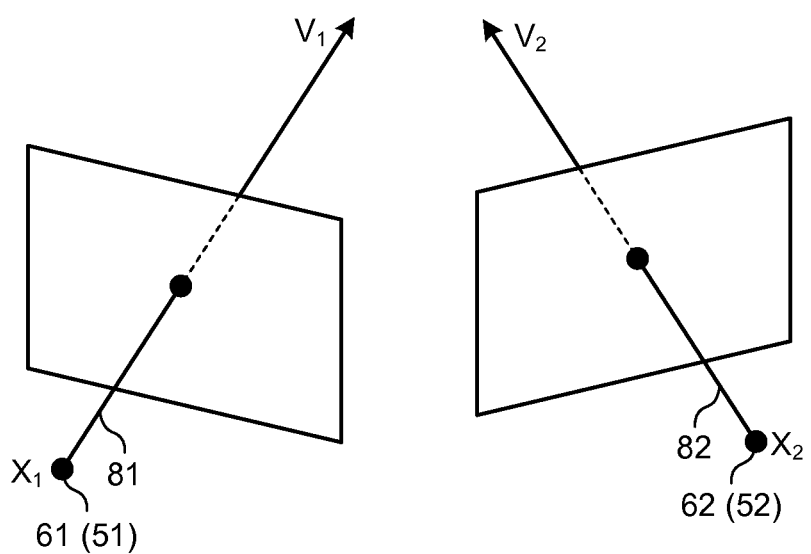
FIG. 3 is a diagram illustrating an example of optical axes according to the first embodiment.

For example, assume that a three-dimensional coordinate $X_1$ represents the three-dimensional position at the first viewpoint 51, and a three-dimensional directional vector $V_1$ represents the three-dimensional orientation at the first viewpoint 51. In that case, as illustrated in FIG. 3, regarding the imaging unit 11 at the first viewpoint 51, an optical center 61 has $X_1$ as the three-dimensional position and a first optical axis 81 has $V_1$ as the three-dimensional orientation. Thus, from the three-dimensional position and the three-dimensional orientation at the first viewpoint 51, the first optical axis 81 can be obtained.

Similarly, for example, assume that a three-dimensional coordinate $X_2$ represents the three-dimensional position at the second viewpoint 52, and a three-dimensional directional vector $V_2$ represents the three-dimensional orientation at the second viewpoint 52. In that case, as illustrated in FIG. 3, regarding the imaging unit 11 at the second viewpoint 52, an optical center 63 has $X_2$ as the three-dimensional position and a second optical axis 82 has $V_2$ as the three-dimensional orientation. Thus, from the three-dimensional position and the three-dimensional orientation at the second viewpoint 52, the second optical axis 82 can be obtained.

Meanwhile, in the first embodiment, although it is assumed that the viewpoints and the optical center are coincident, that is not the only possible case.

Moreover, the axis based on the optical axis of the imaging unit 11 at each viewpoint represents, more particularly, the axis formed by projection of the corresponding optical axis on the perpendicular surface with respect to the cross product of the optical axes. However, if the optical axes are originally positioned on the perpendicular surface with respect to the cross product of the optical axes, the axis based on the optical axis of the imaging unit 11 at each viewpoint represents the optical axis of the imaging unit 11 at that viewpoint.

For example, regarding the first axis based on the first optical axis 81 and the second axis based on the second optical axis 82; the first axis itself represents the axis formed by projecting the first optical axis on the perpendicular surface with respect to the cross product of the first optical axis 81 and the second optical axis 82, and the second axis itself represents the axis formed by projecting the second optical axis on that perpendicular surface.

Figure 4:
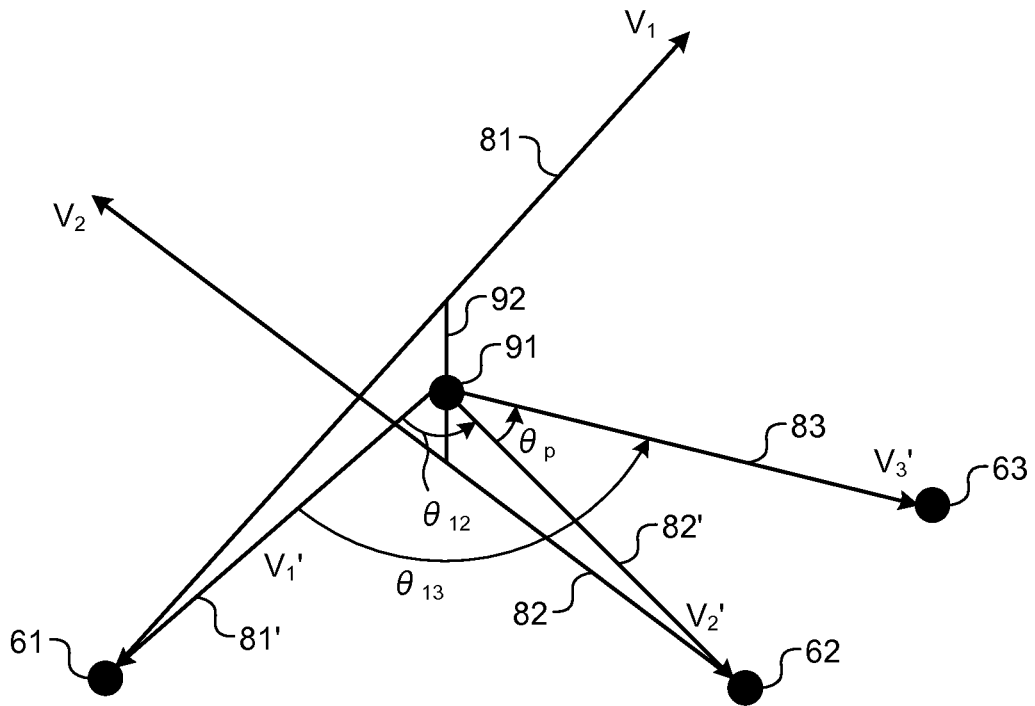
FIG. 4 is a diagram illustrating an example of a first angle according to the first embodiment.

For example, in the example illustrated in FIG. 4, the cross product of the first optical axis 81 and the second optical axis 82 represents the directional vector of a straight line 92 that is the shortest straight line joining the first optical axis 81 and the second optical axis 82. For that reason, the perpendicular surface with respect to the cross product of the first optical axis 81 and the second optical axis 82 can be said to be the surface on which are positioned the optical center 61, an optical center 62, and a center point 91 of the shortest straight line 92 joining the first optical axis 81 and the second optical axis 82. In that case, a first axis 81' represents the axis formed by projecting the first optical axis 81 on that surface, and a second axis 82' represents the axis formed by projecting the second optical axis 82 on that surface. If $V_1'$ represents the three-dimensional directional vector of the first axis 81' and if $V_2'$ represents the three-dimensional directional vector of the second axis 82', then a first angle $\theta_{12}'$ formed between the first axis 81' and the second axis 82' can be obtained using Equation (1) given below.

$$\theta_{12}' = \cos^{-1}(V_1' \cdot V_2'/|V_1'||V_2'|) \tag{1}$$

Herein, $V_1' \cdot V_2'$ represents the inner product of the three-dimensional directional vectors $V_1'$ and $V_2'$; $|V_1'|$ represents the norm of the three-dimensional directional vector $V_1'$; and $|V_2'|$ represents the norm of the three-dimensional directional vector $V_2'$.

Figure 5:
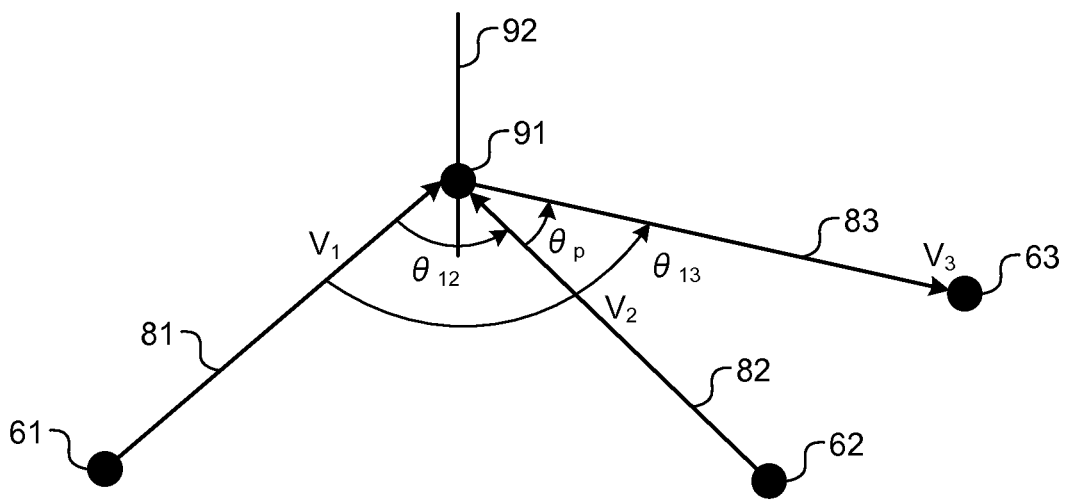
FIG. 5 is a diagram illustrating an example of a first angle according to the first embodiment.

Meanwhile, in the example illustrated in FIG. 5, the cross product of the first optical axis 81 and the second optical axis 82 represents the directional vector of the straight line 92. Herein, since the first optical axis 81 and the second optical axis 82 intersect at an intersection point 91 on the straight line 92, the perpendicular surface with respect to the cross product of the first optical axis 81 and the second optical axis 82 can be said to be the surface on which the optical center 61, the optical center 62, and the intersection point 91 are positioned. In this case, the first optical axis 81 and the second optical axis 82 are positioned on that surface; the first optical axis 81 itself serves as the first axis; and the second optical axis 82 itself serves as the second axis. Then, a first angle $\theta_{12}$ formed between the first optical axis 81 (the first axis) and the second optical axis 82 (the second axis) can be obtained using Equation (2) given below.

$$\theta_{12} = \cos^{-1}(V_1 \cdot V_2/|V_1||V_2|) \tag{2}$$

Herein, $V_1 \cdot V_2$ represents the inner product of the three-dimensional directional vectors $V_1$ and $V_2$; $|V_1|$ represents the norm of the three-dimensional directional vector $V_1$; and $|V_2|$ represents the norm of the three-dimensional directional vector $V_2$.

The third calculator 17 calculates the next viewpoint which is positioned in the direction of increase in the first angle calculated by the second calculator 15 and from which the next imaging is to be performed. For example, the third calculator 17 calculates the next viewpoint which is positioned in the direction of increase in the first angle calculated by the second calculator 15 and from which the next imaging is to be performed, by rotating the second axis with reference to the intersection point of the first axis and the second axis. More particularly, the third calculator 17 calculates the next viewpoint by rotating the directional vector of the first axis in the direction of increase in the first angle by an angle equal to a second angle that is formed between the first axis and the line joining the next viewpoint and the intersection point.

For example, in the example illustrated in FIG. 4, assume that the straight line 92 represents the axis of rotation of the three-dimensional directional vector $V_1'$ of the first axis 81' and that the center point 91 represents the center of rotation of the three-dimensional directional vector $V_1'$. In that case, a directional vector A of the axis of rotation can be obtained using Equation (3) given below.

$$A = V_1 \times V_2 = (ax, ay, az) \tag{3}$$

Herein, $V_1 \times V_2$ represents the cross product of the three-dimensional directional vectors $V_1$ and $V_2$.

A second angle $\theta_{13}'$ formed between a line 83, which joins the optical center 63 of the imaging unit 11 at the next viewpoint and the center point 91 serving as the center of rotation, and the first axis 81' can be obtained using Equation (4) given below.

$$\theta_{13}' = \theta_{12}' + \theta_p \tag{4}$$

Herein, $\theta_p$ represents the angle formed between the line 83 and the second axis 82'.

Meanwhile, in the first embodiment, it is assumed that, when the second axis 82' is rotated with reference to the center point 91 serving as the center of rotation, the next viewpoint is positioned in the direction of increase in the first angle $\theta_{12}'$. More specifically, the next viewpoint is assumedly positioned at a position reached by rotating the second axis 82' by about 30° with reference to the center point 91 in the direction of increase in the first angle $\theta_{12}'$. However, that is not the only possible case.

Then, a three-dimensional directional vector $V_3'$ starting from the center point 91, which serves as the center of rotation, toward the optical center 63 of the imaging unit 11 at the next viewpoint can be obtained according to Rodrigues formula using Equations (5) to (7) given below.

$$R = \begin{pmatrix} 0 & -az & ay \\ az & 0 & -ax \\ -ay & ax & 0 \end{pmatrix} \tag{5}$$

Herein, R represents a rotation matrix for rotating the three-dimensional directional vector $V_1'$ of the first axis 81' around the axis A of rotation.

$$R' = I + \sin\theta_{13}'/\theta_{12}' R + (1-\cos\theta_{13}')/\theta_{12}'^2 R^2 \tag{6}$$

R' represents a rotation matrix for rotating the three-dimensional directional vector $V_1'$ of the first axis 81' around the axis A of rotation by the second angle $\theta_{13}'$.

$$V_3' = R'V_1' \tag{7}$$

With that, the next viewpoint is calculated.

Meanwhile, regarding the example illustrated in FIG. 5, identical operations to the operations performed in the example illustrated in FIG. 4 can be performed with the following settings: the first axis 81' as a first axis 81, the second axis 82' as a second axis 82, the three-dimensional directional vector $V_1'$ as the three-dimensional directional vector $V_1$, the three-dimensional directional vector $V_2'$ as the three-dimensional directional vector $V_2$, and the three-dimensional directional vector $V_3'$ as the three-dimensional directional vector $V_3$. Hence, the detailed explanation is not given.

The output controller 19 instructs the output unit 21 to output information prompting movement of the imaging unit 11 in the direction of the next viewpoint from the second viewpoint 52. More particularly, the output controller 19 instructs the output unit 21 to output information prompting movement of the imaging unit 11 to the next viewpoint from the second viewpoint 52.

Figure 6:
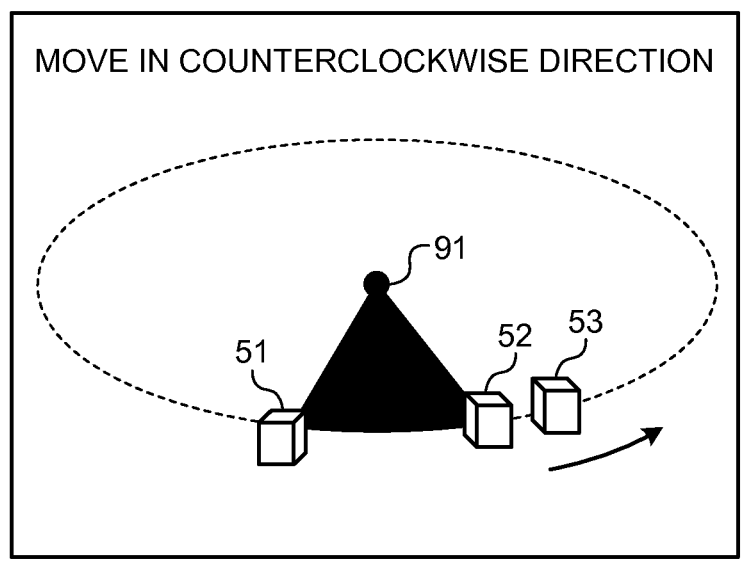
FIG. 6 is a diagram illustrating an example of the output according to the first embodiment.

For example, as illustrated in FIG. 6, the output controller 19 performs visualization of the first viewpoint 51, the second viewpoint 52, a next viewpoint 53, the center point 91 serving as the center of rotation, and the first angle $\theta_{12}'$ (or sometimes the first angle $\theta_{12}$); outputs the visualization result to the output unit 21; and outputs a message prompting movement in the counterclockwise direction for the purpose of moving the imaging unit 11 from the second viewpoint 52 to the next viewpoint 53, that is, moving the imaging unit 11 in the direction of increase in the first angle $\theta_{12}'$ from the second viewpoint 52. Moreover, the output controller 19 can also output the second angle $\theta_{13}'$ to the output unit 21.

Figure 7:
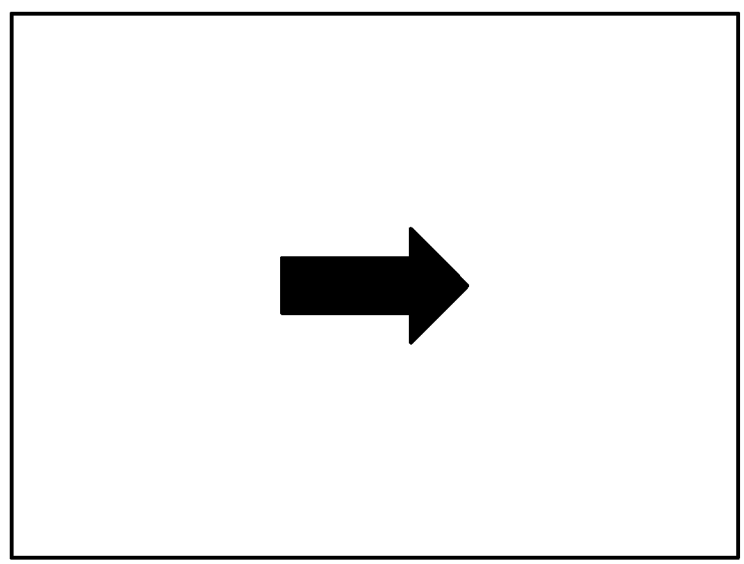
FIG. 7 is a diagram illustrating an example of the output according to the first embodiment.

Furthermore, for example, as illustrated in FIG. 7, in order to move the imaging unit 11 from the second viewpoint 52 to the next viewpoint 53, that is, in order to move the imaging unit 11 in the direction of increase in the first angle $\theta_{12}'$ from the second viewpoint 52, the output controller 19 can output to the output unit 21 an arrow representing the direction of movement of the imaging unit 11.

Alternatively, for example, the output controller 19 can output to the output unit 21 the information prompting movement of the imaging unit 11 in the direction of increase in the first angle $\theta_{12}'$ from the second viewpoint 52.

Still alternatively, the output controller 19 can output to the output unit 21 a notification that the movement of the imaging unit 11 is inappropriate.

Figure 8:
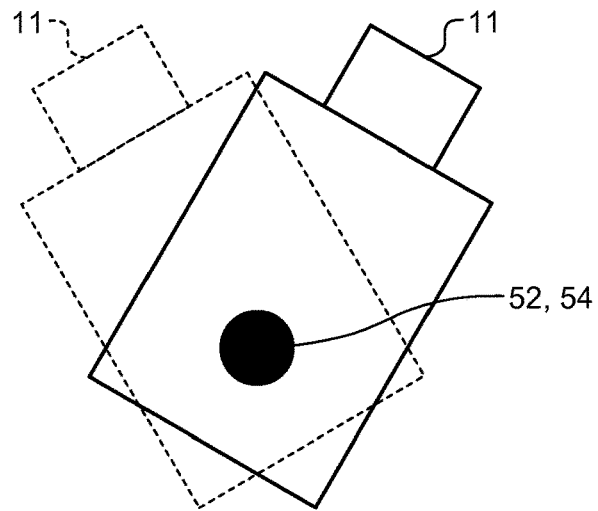
FIG. 8 is a diagram illustrating an example of inappropriate movement of the imaging unit according to the first embodiment.

For example, as illustrated in FIG. 8, as a result of rotationally-moving the imaging unit 11 from the second viewpoint to a third viewpoint 54, assume that the optical center 62 of the imaging unit 11 at the second viewpoint 52 becomes coincident with the optical center of the imaging unit 11 at the third viewpoint 54. In that case, a second image taken at the second viewpoint 52 and a third image taken at the third viewpoint 54 do not have any parallax therebetween. For that reason, the position and the orientation of the imaging unit 11 at the third viewpoint 54 cannot be calculated. Thus, the movement of the imaging unit 11 is inappropriate. Meanwhile, the third viewpoint 54 is assumed to be the viewpoint to which the imaging unit 11 actually moves from the second viewpoint 52 and which is different than the next viewpoint 53.

Meanwhile, for example, if the imaging unit 11 is moved to the third viewpoint by moving it in the opposite direction to the direction prompted by the output unit 21, that is, in the direction of decrease in the first angle $\theta_{12}'$ from the second viewpoint 52, the work efficiency undergoes a decline thereby making the movement of the imaging unit 11 inappropriate.

Moreover, for example, even when the imaging unit 11 is moved toward the third viewpoint along the direction prompted by the output unit 21, if the amount of movement is not sufficient, the number of feature points that are newly associated between the two images becomes insufficient. Hence, the position and the orientation of the imaging unit 11 at the third viewpoint 54 cannot be calculated, thereby making the movement of the imaging unit 11 inappropriate.

In such a case, the output controller 19 outputs to the output unit 21 a notification that the movement of the imaging unit 11 is inappropriate. More particularly, the imaging unit 11 takes a third image capturing the object 40 from the third viewpoint to which it has actually moved. Then, using the first image and the third image, the first calculator 13 calculates a third position and a third orientation of the imaging unit 11 at the third viewpoint. Similarly, using the second image and the third image, the first calculator 13 calculates a fourth position and a fourth orientation of the imaging unit 11 at the third viewpoint. The second calculator 15 refers to the first position, the first orientation, the third position, and the third orientation; and calculates a third angle formed between the first axis 81' and a third axis that is based on a third optical axis of the imaging unit 11 at the third viewpoint. The third axis represents the axis formed by projection of the third optical axis on the perpendicular surface with respect to the cross product of the first optical axis 81 and the second optical axis 82. Then, if the third angle is smaller than the first angle $\theta_{12}'$ or if the fourth position and the fourth orientation cannot be calculated, the output controller 19 outputs to the output unit 21 a notification that the movement of the imaging unit 11 is inappropriate. At that time, the output controller 19 can further output to the output unit 21 the information prompting movement of the imaging unit 11 in the direction of the next viewpoint that was calculated when the imaging unit 11 was positioned at the second viewpoint 52.

Figure 9:
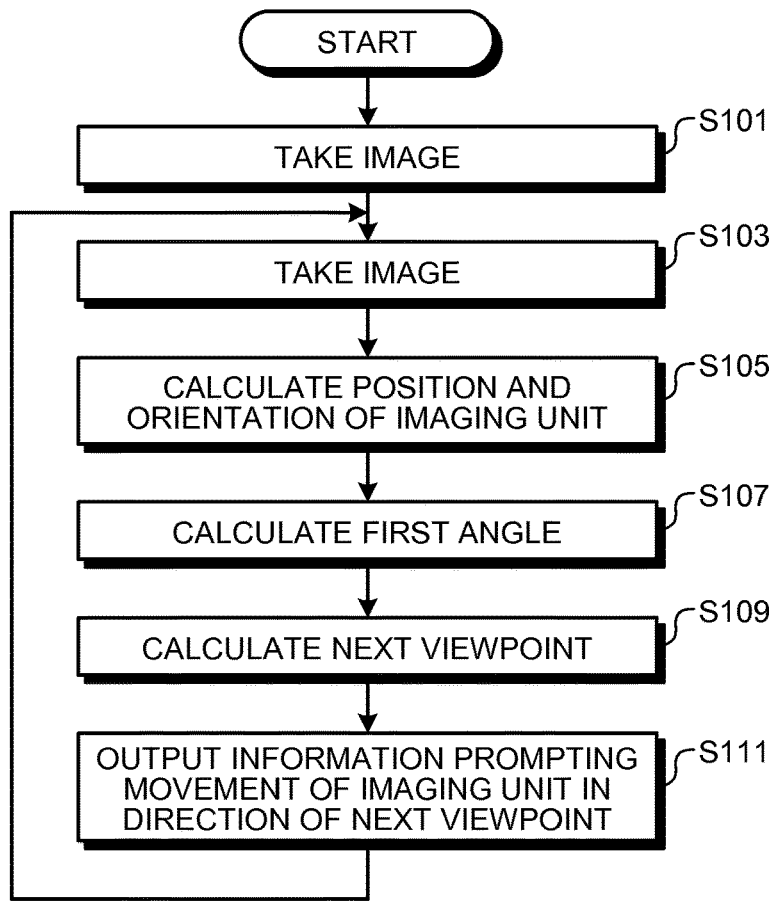
FIG. 9 is a flowchart for explaining an exemplary sequence of operations performed in the movement assisting device according to the first embodiment.

FIG. 9 is a flowchart for explaining an exemplary sequence of operations performed in the movement assisting device 10 according to the first embodiment.

Firstly, the imaging unit 11 takes an i-th image of the object 40 from an i-th viewpoint (Step S101). Herein, the initial value of i is 1.

Then, the imaging unit 11 takes an (1+i)-th image of the object 40 at the (1+i)-th viewpoint (Step S103).

Subsequently, using the i-th image and the (1+i)-th image, the first calculator 13 calculates the i-th position and the i-th orientation of the imaging unit 11 at the i-th viewpoint; and calculates the (1+i)-th position and the (1+i)-th orientation of the imaging unit 11 at the (1+i)-th viewpoint (Step S105).

Then, the second calculator 15 refers to the i-th position, the i-th orientation, the (1+i)-th position, and the (1+i)-th orientation; and calculates a first angle formed between an i-th axis, which is based on an i-th optical axis of the imaging unit 11 at the i-th viewpoint, and an (1+i)-th axis, which is based on an (1+i)-th optical axis of the imaging unit 11 at the (1+i)-th viewpoint (Step S107).

Subsequently, the third calculator 17 rotates the (1+i)-th axis with reference to the intersection point of the i-th axis and the (1+i)-th axis, and calculates the next viewpoint which is positioned in the direction of increase in the first angle and from which the next imaging is to be performed (Step S109).

Then, the output controller 19 instructs the output unit 21 to output information prompting movement of the imaging unit 11 in the direction of the next viewpoint from the (1+i)-th viewpoint (Step S111).

After the operation at Step S111 is completed, i is incremented by 1 and the operations from Steps S103 to S111 are repeated.

In this way, according to the first embodiment, the information is output for prompting movement of the imaging unit 11 in the direction of the next viewpoint, at which the next imaging (measurement) is to be done, from the viewpoint at which the current imaging (measurement) is done. Hence, even if the user has a low degree of proficiency, he or she can determine the direction in which the imaging unit has to be moved to reach the next viewpoint. That enables achieving enhancement in the work efficiency.

Moreover, according to the first embodiment, when the imaging unit 11 is moved in an inappropriate manner, a notification about the same is output. Hence, it becomes possible to prevent a situation in which the work efficiency undergoes a decline.

Second Embodiment

In a second embodiment, the explanation is given about an example for determining whether or not the calculation of the position and the orientation of the imaging unit can be started. The following explanation is given mainly about the differences with the first embodiment. Moreover, the constituent elements having identical functions to the first embodiment are referred to by the same names/reference numerals and the relevant explanation is not repeated.

Figure 10:
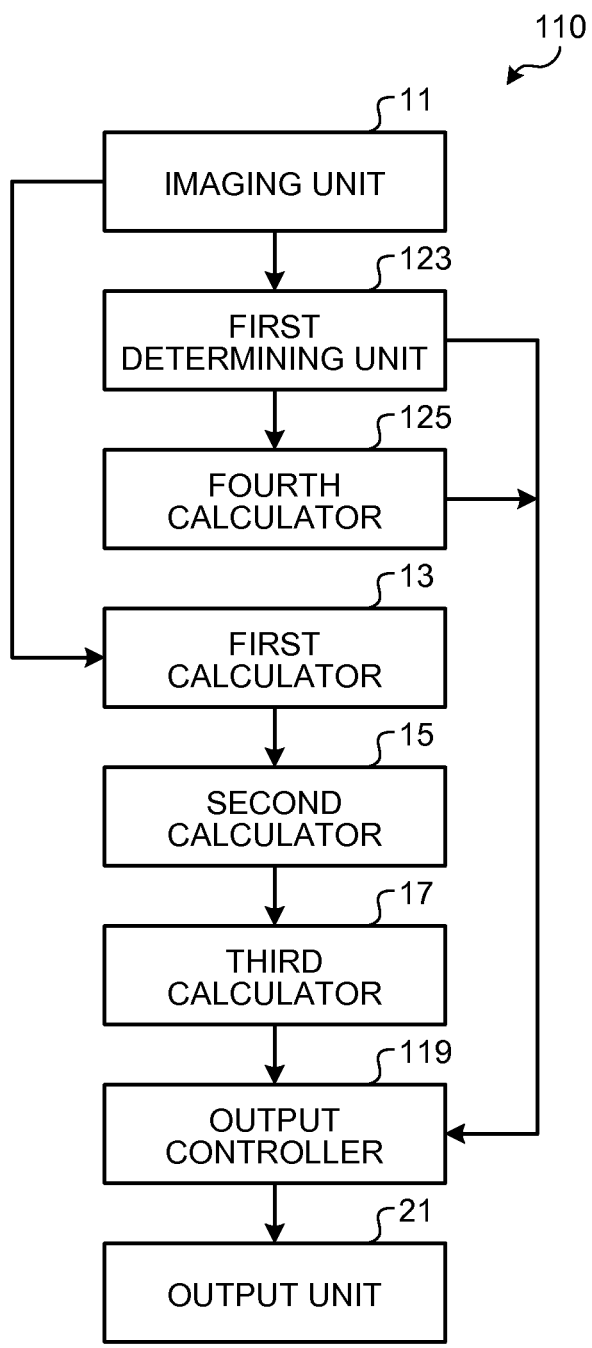
FIG. 10 is a configuration diagram illustrating an example of a movement assisting device according to a second embodiment.

FIG. 10 is a configuration diagram illustrating an example of a movement assisting device 110 according to the second embodiment. As illustrated in FIG. 10, in the movement assisting device 110 according to the second embodiment; a first determining unit 123, a fourth calculator 125, and an output controller 119 differ from the first embodiment.

The first determining unit 123 detects a plurality of first feature points in a first image taken by the imaging unit 11; and, based on at least one of the number and the distribution of the detected first feature points, determines whether or not to start the calculation of the position and the orientation of the imaging unit 11. More particularly, if at least one of the number and the distribution of the first feature points exceeds a first threshold value, then the first determining unit 123 determines to start the calculation of the position and the orientation of the imaging unit 11. However, if at least one of the number and the distribution of the first feature points is equal to or smaller than the first threshold value, then the first determining unit 123 determines that the calculation of the position and the orientation of the imaging unit 11 cannot be started.

When it is determined to start the calculation of the position and the orientation of the imaging unit 11, the fourth calculator 125 calculates the position of the center of gravity of the first feature points in the first image.

When it is determined to start the calculation of the position and the orientation of the imaging unit 11, the output controller 119 instructs the output unit 21 to output information prompting movement of the imaging unit 11 in the direction based on the position of the center of gravity calculated by the fourth calculator 125.

Figure 11:
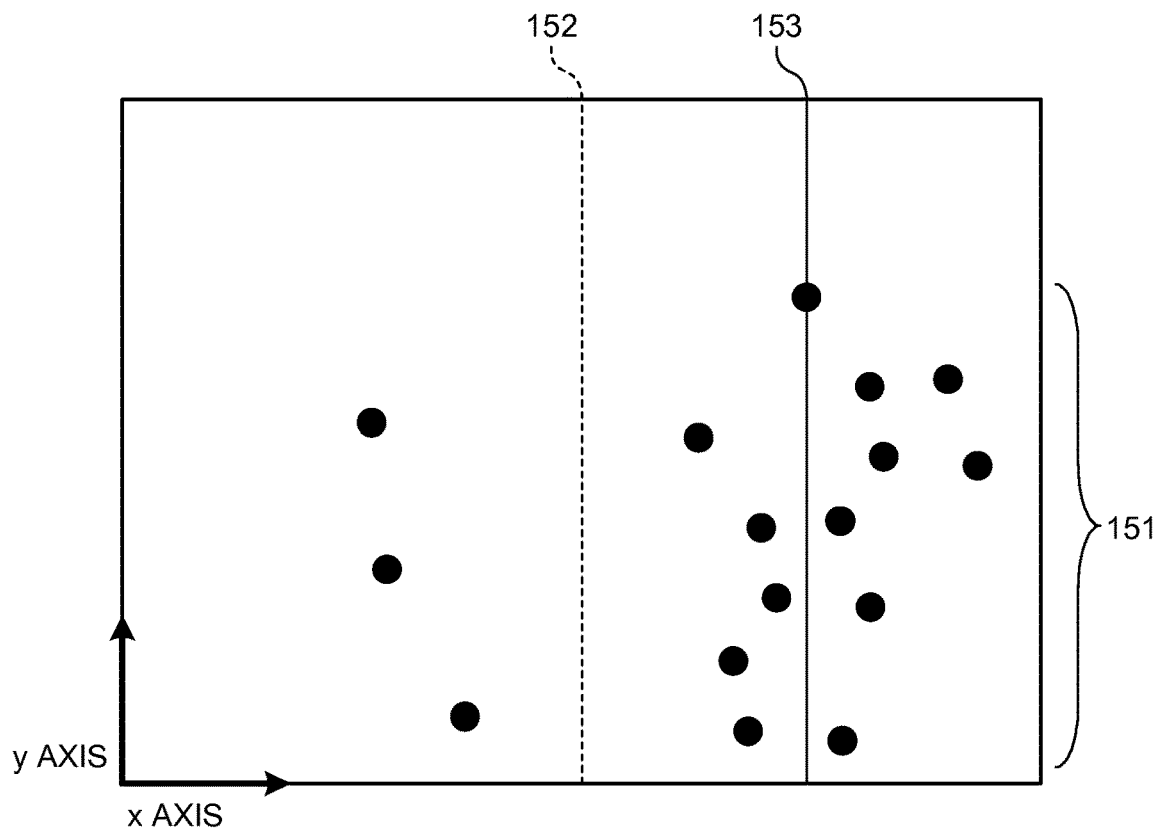
FIG. 11 is a diagram illustrating an example of the position of the center of gravity according to the second embodiment.
Figure 12:
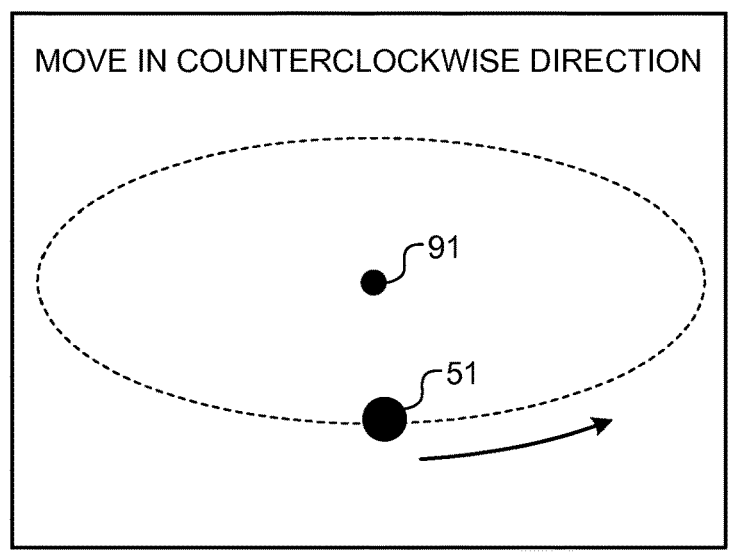
FIG. 12 is a diagram illustrating an example of the output according to the second embodiment.

For example, as illustrated in FIG. 11, if a position 153 of the center of gravity of first feature points 151 is on the right-hand side of a center 152 of the first image, then the output controller 119 outputs to the output unit 21 the information prompting movement of the imaging unit 11 in the counterclockwise direction from the first viewpoint 51. With that, the second viewpoint 52 can be expected to be positioned in the counterclockwise direction of the first viewpoint 51. Hence, in a second image taken by the imaging unit 11 from the second viewpoint 52, a plurality of second feature points corresponding to the first feature points can be expected to gather in the center of the second image as compared to the first image. That is, the second feature points can be expected to appear in the second image. As a result, the calculation of the position and the orientation of the imaging unit 11 from the second viewpoint 52 can be expected to be more likely to be successful. Meanwhile, in the example illustrated in FIG. 11, the position 153 of the center of gravity on the x-axis is obtained using the x-coordinates of the first feature points 151.

If the position of the center of gravity of the first feature points is on the left-hand side of the center of the first image, the output controller 119 outputs to the output unit 21 the information prompting movement of the imaging unit 11 in the clockwise direction from the first viewpoint 51.

Meanwhile, if it is determined that the calculation of the position and the orientation of the imaging unit 11 cannot be started, the output controller 119 outputs to the output unit 21 the information prompting to retake the first image by changing the first viewpoint.

Figure 13:
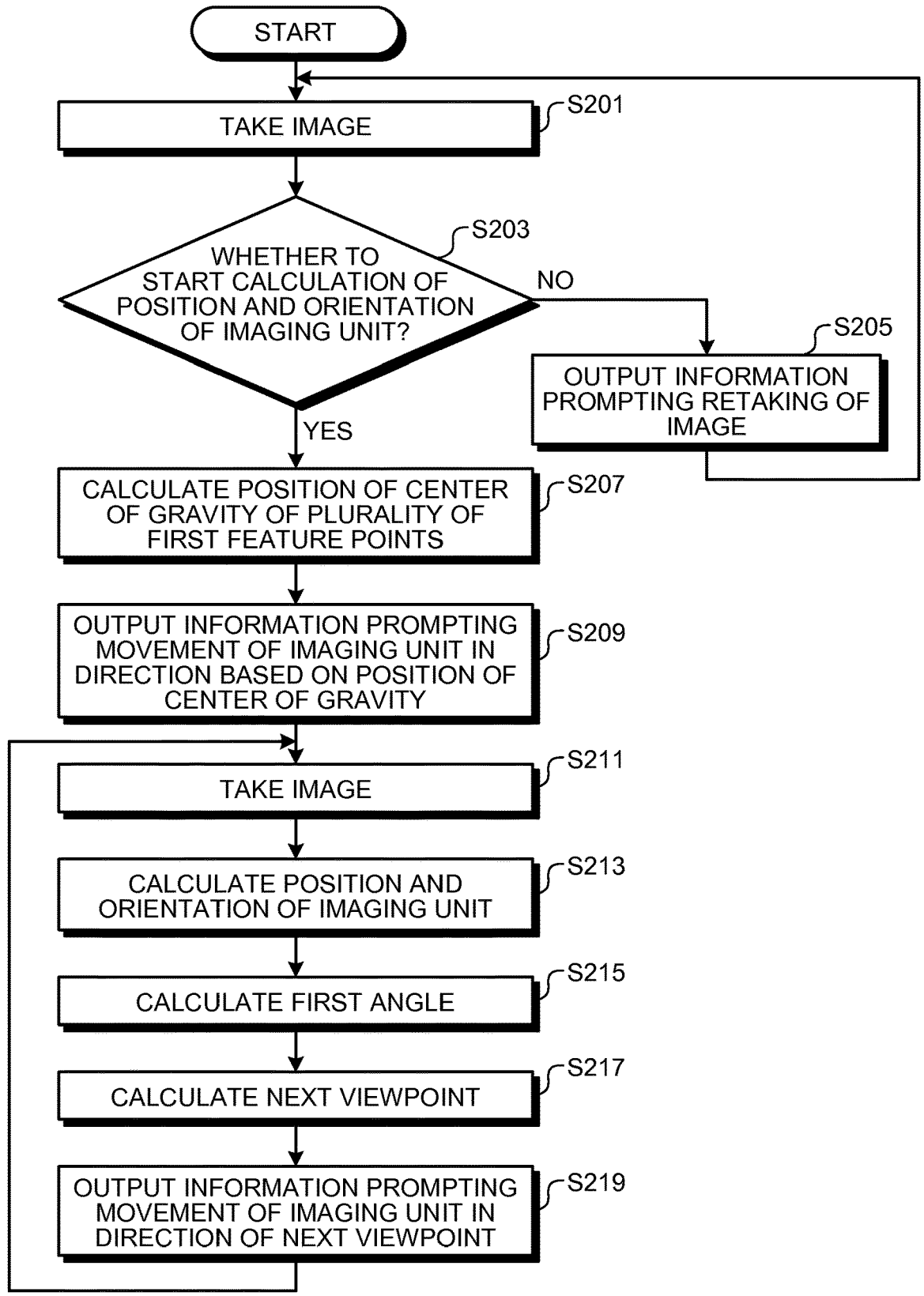
FIG. 13 is a flowchart for explaining a sequence of operations performed in the movement assisting device according to the second embodiment.

FIG. 13 is a flowchart for explaining a sequence of operations performed in the movement assisting device 110 according to the second embodiment.

Firstly, the imaging unit 11 takes an i-th image of the object 40 from an i-th viewpoint (Step S201). Herein, the initial value of i is 1.

Then, the first determining unit 123 detects a plurality of the i-th feature points in the i-th image taken by the imaging unit 11 and, based on either the number or the distribution of the detected i-th feature points, determines whether or not to start the calculation of the position and the orientation of the imaging unit 11 (Step S203).

If the calculation of the position and the orientation of the imaging unit 11 cannot be started (No at Step S203), then the output controller 119 outputs to the output unit 21 the information prompting to retake the i-th image by changing the i-th viewpoint (Step S205).

On the other hand, if the calculation of the position and the orientation of the imaging unit 11 can be started (Yes at Step S203), then the fourth calculator 125 calculates the position of the center of gravity of the i-th feature points in the i-th image (Step S207).

Subsequently, the output controller 119 instructs the output unit 21 to output information prompting movement of the imaging unit 11 in the direction based on the position of the center of gravity calculated by the fourth calculator 125 (Step S209).

The subsequent operations performed at Steps S211 to S219 are identical to the operations performed at Steps S103 to S111 illustrated in the flowchart in FIG. 9. Hence, the relevant explanation is not repeated.

In this way, according to the second embodiment, only when a first image that enables calculation of the position and the orientation of the imaging unit 11 is taken, the calculation of the position and the orientation of the imaging unit 11 is started. That enables achieving enhancement in the work efficiency.

Moreover, according to the second embodiment, the information prompting movement of the imaging unit 11 in the direction of the next viewpoint, at which the next imaging (measurement) is to be done, is output before the start of the calculation of the position and the orientation of the imaging unit 11. That enables achieving enhancement in the work efficiency.

Third Embodiment

In a third embodiment, the explanation is given for an example for determining whether or not the calculation of the position and the orientation of the imaging unit can be ended. The following explanation is given mainly about the differences with the first embodiment. Moreover, the constituent elements having identical functions to the first embodiment are referred to by the same names/reference numerals and the relevant explanation is not repeated.

Figure 14:
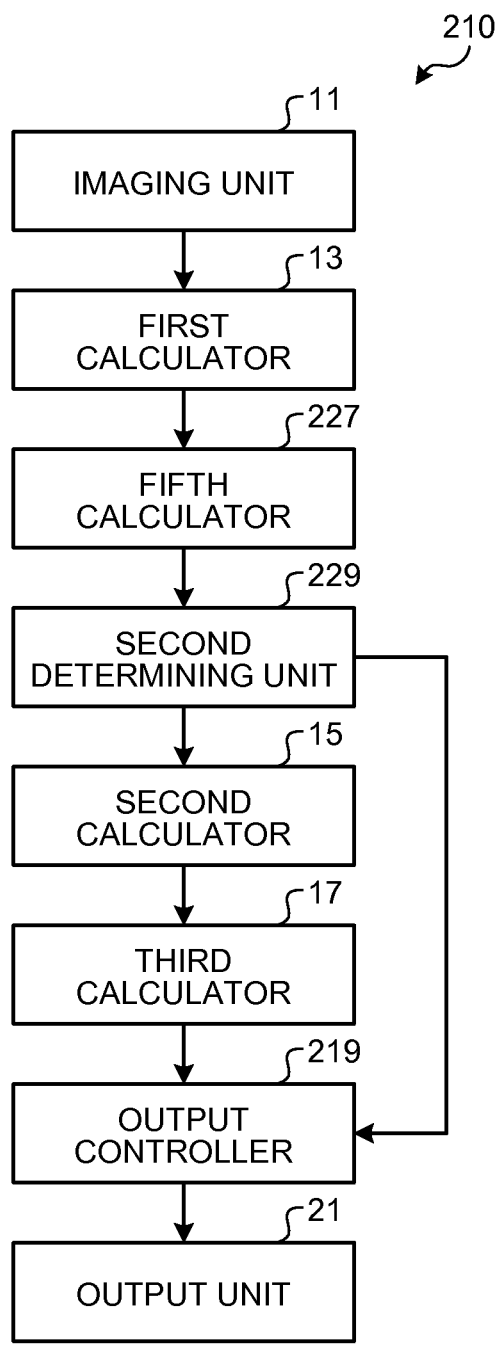
FIG. 14 is a configuration diagram illustrating an example of a movement assisting device according to a third embodiment.

FIG. 14 is a configuration diagram illustrating an example of a movement assisting device 210 according to the third embodiment. As illustrated in FIG. 14, in the movement assisting device 210 according to the third embodiment; a fifth calculator 227, a second determining unit 229, and an output controller 219 differ from the first embodiment.

For each set of a first feature point and a second feature point associated to each other by the first calculator 13, the fifth calculator 227 calculates a fourth angle formed between the line which joins the first feature point and the first viewpoint and the line which joins the second feature point and the first viewpoint; and calculates a fifth angle formed between the line which joins the first feature point and the second viewpoint and the line which joins the second feature point and the second viewpoint.

Figure 15:
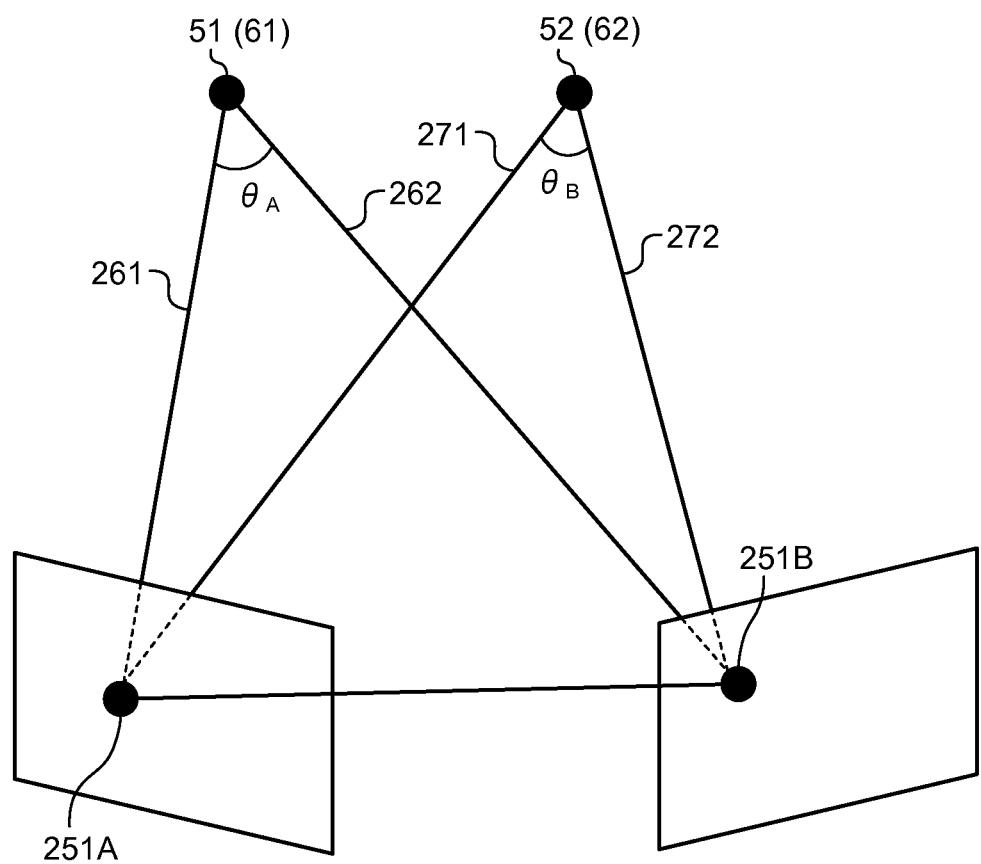
FIG. 15 is a diagram illustrating an example of a fourth angle and a fifth angle according to the third embodiment.

For example, as illustrated in FIG. 15, with respect to the set of a first feature point 251A and a second feature point 251B, the fifth calculator 227 calculates a fourth angle $\theta_A$ that is formed between a line 261, which joins the first feature point 251A and the first viewpoint 51 (the optical center 61), and a line 262, which joins the second feature point 251B and the first viewpoint 51 (the optical center 61); and calculates a fifth angle $\theta_B$ that is formed between a line 271, which joins the first feature point 251A and the second viewpoint 52 (the optical center 62), and a line 272, which joins the second feature point 251B and the second viewpoint 52 (the optical center 62).

Then, based on a plurality of fourth angles and a plurality of fifth angles, the second determining unit 229 determines whether or not to end the calculation of the position and the orientation of the imaging unit 11. More particularly, if at least one of the smallest value, the average value, and the median value of the fourth angles and the fifth angles exceeds a second threshold value, then the second determining unit 229 determines to end the calculation of the position and the orientation of the imaging unit 11.

As explained in the first embodiment, the first calculator 13 calculates the position and the orientation of the imaging unit 11 and accordingly also measures (calculates) the three-dimensional shape of that portion of the object which appears in a plurality of images. When the position and the orientation of the imaging unit 11 is newly calculated, the three-dimensional shape of a new portion of the object is also measured (calculated) and the three-dimensional shape of the already-measured (the already-calculated) portion is also updated.

Generally, regarding the three-dimensional shape of the already-measured (the already-calculated) portion, higher the frequency of it being updated, the higher becomes the accuracy of the calculation (measurement). Thus, the fourth angles and the fifth angles tend to become greater. For that reason, in the third embodiment, if at least one of the smallest value, the average value, and the median value of the fourth angles and the fifth angles exceeds the second threshold value, it is determined that the three-dimensional shape of the object 40 has been measured at the required accuracy. Hence, the calculation of the position and the orientation of the imaging unit 11 is ended. That is, the measurement of the three-dimensional shape of the object 40 is ended.

The output controller 219 instructs the output unit 21 to output a notification about the determination to end the calculation of the position and the orientation of the imaging unit 11.

Figure 16:
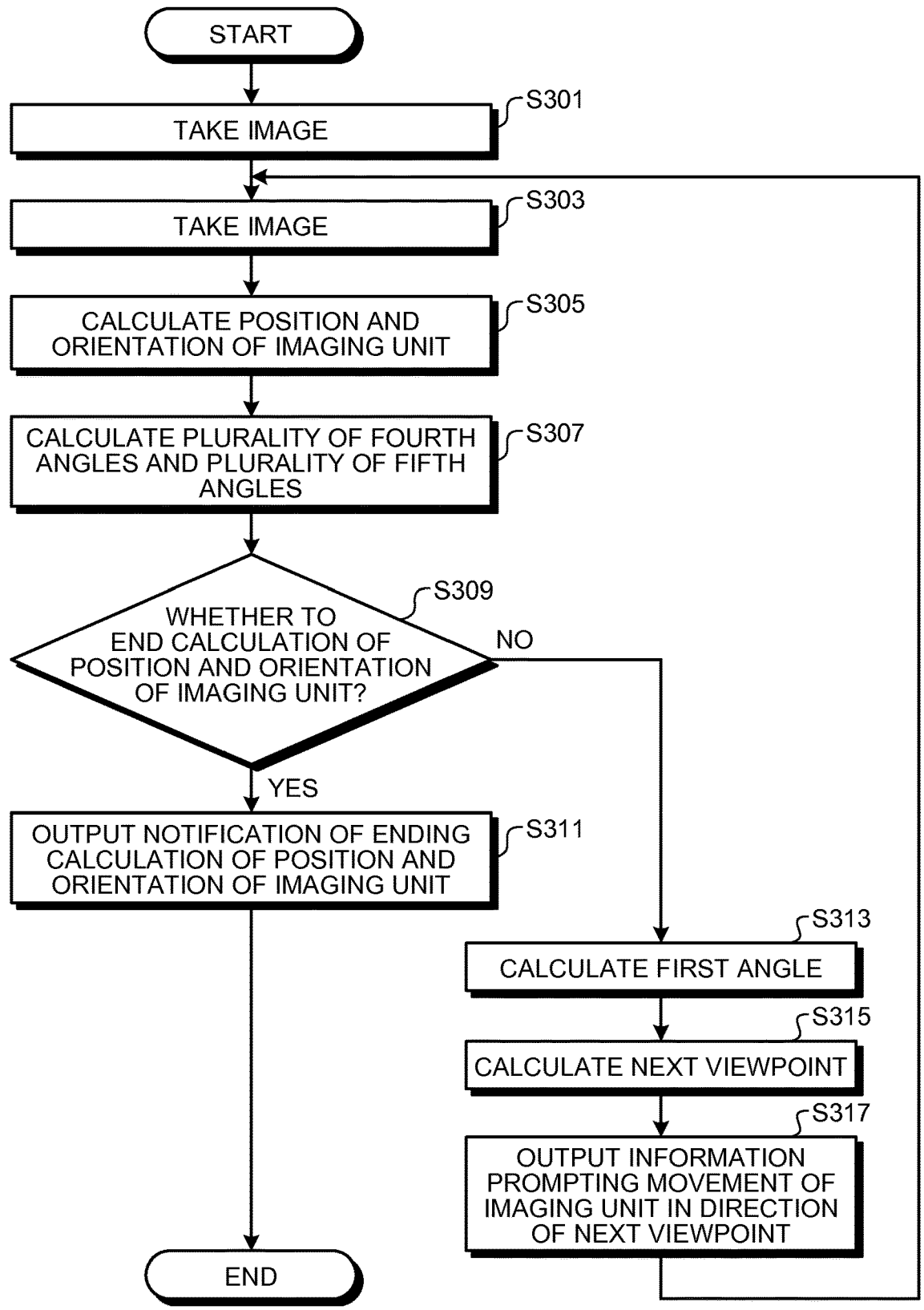
FIG. 16 is a flowchart for explaining a sequence of operations performed in the movement assisting device according to the third embodiment.

FIG. 16 is a flowchart for explaining an exemplary sequence of operations performed in the movement assisting device 210 according to the third embodiment.

The operations performed at Steps S301 to S305 are identical to the operations performed at Steps S101 to S105 illustrated in the flowchart in FIG. 9.

Then, for each set of the i-th feature point and the (i+1)-th feature point associated to each other by the first calculator 13, the fifth calculator 227 calculates a fourth angle formed between the line which joins the i-th feature point and the i-th viewpoint and the line which joins the (i+1)-th feature point and the i-th viewpoint; and calculates a fifth angle formed between the line which joins the i-th feature point and the (i+1)-th viewpoint and the line which joins the (i+1)-th feature point and the (i+1)-th viewpoint (Step S307).

Then, based on a plurality of fourth angles and a plurality of fifth angles, the second determining unit 229 determines whether or not to end the calculation of the position and the orientation of the imaging unit 11 (Step S309).

In the case of ending the calculation of the position and the orientation of the imaging unit 11 (Yes at Step S309), the output controller 219 instructs the output unit 21 to output a notification about the same (Step S311).

On the other hand, if the case of not ending the calculation of the position and the orientation of the imaging unit 11 (No at Step S309), the system control proceeds to Step S313.

The subsequent operations performed at Steps S313 to S317 are identical to the operations performed at Steps S107 to S111 illustrated in the flowchart in FIG. 9. Hence, the relevant explanation is not repeated.

In this way, according to the third embodiment, when it becomes possible to end the calculation of the position and the orientation of the imaging unit 11, a notification about the same is output. That enables achieving enhancement in the work efficiency.

Hardware Configuration

Figure 17:
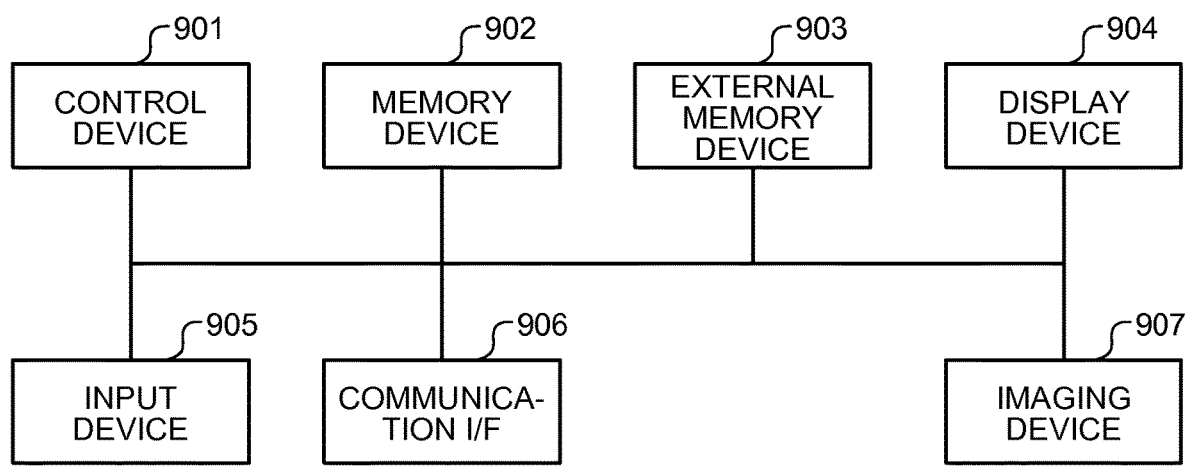
FIG. 17 is a block diagram illustrating an exemplary hardware configuration of the movement assisting device according to the embodiments described above.

FIG. 17 is a block diagram illustrating an exemplary hardware configuration of the movement assisting device according to the embodiments described above. As illustrated in FIG. 17, the movement assisting device according to the embodiments described above has the hardware configuration of a general-purpose computer that includes a control device 901 such as a central processing unit (CPU), a memory device 902 such as a read only memory (ROM) or a random access memory (RAM), an external memory device 903 such as a hard disk drive (HDD) or a solid state drive (SSD), a display device 904 such as a display, an input device 905 such as a mouse or a keyboard, a communication I/F 906, and an imaging device 907 such as a camera.

The computer programs executed in the movement assisting device according to the embodiments described above are stored in advance in a ROM.

Alternatively, the computer programs executed in the movement assisting device according to the embodiments described above can be stored as installable or executable files in a computer-readable memory medium such as a compact disk read only memory (CD-ROM), a compact disk readable (CD-R), a memory card, a digital versatile disk (DVD), or a flexible disk (FD).

Still alternatively, the computer programs executed in the movement assisting device according to the embodiments described above can be saved as downloadable files on a computer connected to the Internet or can be made available for distribution through a network such as the Internet.

The computer programs executed in the movement assisting device according to the embodiments described above contain a module for implementing each constituent element in a computer. As the actual hardware, for example, the control device 901 loads the computer programs from the external memory device 903 in the memory device 902 and executes them. As a result, the constituent elements are implemented in the computer.

As described above, according to the embodiments, it becomes possible to enhance the work efficiency.

For example, unless contrary to the nature thereof, the steps of the flowcharts according to the embodiments described above can have a different execution sequence, can be executed in plurality at the same time, or can be executed in a different sequence every time.

Moreover, for example, the second embodiment and the third embodiment can be combined together.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A movement assisting device comprising:
   a camera configured to take a first image of an object from a first viewpoint and take a second image of the object from a second viewpoint different from the first viewpoint; and
   processing circuitry configured to:
      calculate, using the first image and the second image, a first position and a first orientation of the camera at the first viewpoint and calculate a second position and a second orientation of the camera at the second viewpoint;
      calculate, with reference to the first position, the first orientation, the second position, and the second orientation, a first axis based on a first optical axis of the camera at the first viewpoint, a second axis based on a second optical axis of the camera at the second viewpoint, and a first angle formed between the first axis and the second axis, the first optical axis and the second optical axis each passing through an optical center of the camera;
      calculate, using the first axis, the second axis, and the first angle, a next viewpoint at which next imaging is to be performed and which is positioned in a direction of increase of the first angle, by rotating the second axis with reference to an intersection point of the first axis and the second axis, before an image is taken at the next viewpoint; and
      output information prompting movement of the camera in a direction of the next viewpoint from the second viewpoint, wherein
   the camera is configured to take a third image of the object from a third viewpoint,
   the processing circuitry is configured to calculate a third position and a third orientation of the camera at the third viewpoint using the first image and the third image, and calculate a fourth position and a fourth orientation of the camera at the third viewpoint using the second image and the third image,
   the processing circuitry is configured to calculate a third angle formed between the first axis and a third axis that is based on a third optical axis of the camera at the third viewpoint with reference to the first position, the first orientation, the third position, and the third orientation, and
   when the third angle is smaller than the first angle or when the fourth position and the fourth orientation cannot be calculated, the processing circuitry is configured to output a notification that movement of the camera is inappropriate.

2. The device according to claim 1, wherein
   the first axis is the first optical axis projected on a surface perpendicular to a direction of a cross product of the first optical axis and the second optical axis, and the second axis is the second optical axis projected on the surface.

3. The device according to claim 1, wherein the processing circuitry is configured to calculate the next viewpoint by rotating a directional vector of the first axis in the direction of increase in the first angle by an angle equal to a second angle that is formed between the first axis and a line joining the next viewpoint and the intersection point.

4. The device according to claim 1, wherein the processing circuitry is configured to output information prompting movement of the camera from the second viewpoint to the next viewpoint.

5. The device according to claim 1, wherein the third axis is the third optical axis projected on a surface perpendicular to a direction of a cross product of the first optical axis and the second optical axis.

6. The device according to claim 1, wherein the processing circuitry is configured to:
   determine whether or not to start calculation of position and orientation of the camera, based on at least one of number and distribution of a plurality of first feature points in the first image;
   calculate, when the processing circuitry determines to start calculation, position of a center of gravity of the plurality of first feature points in the first image; and
   output information prompting movement of the camera in a direction based on the position of the center of gravity.

7. The device according to claim 6, wherein
   the processing circuitry is configured to, when the position of the center of gravity is on a right side of a center of the first image, output information prompting movement of the camera in a counterclockwise direction, and
   the processing circuitry is configured to, when the position of the center of gravity is on a left side of the center of the first image, output information prompting movement of the camera in a clockwise direction.

8. The device according to claim 6, wherein the processing circuitry is configured to, when the processing circuitry determines to not start calculation, output information prompting retaking of the first image.

9. The device according to claim 6, wherein the processing circuitry is configured to, when at least one of the number and the distribution exceeds a first threshold value, determine to start calculation of position and orientation of the camera.

10. The device according to claim 1, wherein the processing circuitry is configured to:
    calculate the first position, the first orientation, the second position, and the second orientation by associating a plurality of first feature points in the first image with a plurality of second feature points in the second image,
    calculate a plurality of second angles and a plurality of third angles by calculating, for each set of a first feature point and a second feature point associated with each other, a second angle of the plurality of second angles, the second angle formed between a line which joins the first feature point and the first viewpoint and a line which joins the second feature point and the first viewpoint, and a third angle of the plurality of third angles, the third angle formed between a line which joins the first feature point and the second viewpoint and a line which joins the second feature point and the second viewpoint; and determine whether or not to end calculation of position and orientation of the camera, based on the plurality of second angles and the plurality of third angles, and when the processing circuitry determines to end calculation, output a notification of end of calculation.

11. The device according to claim 10, wherein the processing circuitry is configured to, when at least one of a smallest value, an average value, or a median value of the plurality of second angles and the plurality of third angles exceeds a second threshold value, determine to end calculation of position and orientation of the camera.

12. The device according to claim 1, wherein the processing circuitry comprises an integrated circuit (IC).

13. The device according to claim 1, wherein the processing circuitry comprises a processor for executing program instructions.

14. A movement assisting method comprising:
taking, using a camera, a first image of an object from a first viewpoint;
taking, using the camera, a second image of the object after the camera moves to a second viewpoint different from the first viewpoint;
calculating, using the first image and the second image, a first position and a first orientation of the camera at the first viewpoint;
calculating a second position and a second orientation of the camera at the second viewpoint;
calculating, with reference to the first position, the first orientation, the second position, and the second orientation, a first axis based on a first optical axis of the camera at the first viewpoint, a second axis based on a second optical axis of the camera at the second viewpoint, and a first angle formed between the first axis and the second axis, the first optical axis and the second optical axis passing through an optical center of the camera;
calculating, using the first axis, the second axis, and the first angle, a next viewpoint at which next imaging is to be performed and which is positioned in a direction of increase of the first angle, by rotating the second axis with reference to an intersection point of the first axis and the second axis, before an image is taken at the next viewpoint; and
outputting information prompting movement of the camera in a direction of the next viewpoint from the second viewpoint, wherein the method further comprises,
taking, using the camera, a third image of the object from a third viewpoint,
calculating a third position and a third orientation of the camera at the third viewpoint using the first image and the third image,
calculating a fourth position and a fourth orientation of the camera at the third viewpoint using the second image and the third image,
calculating a third angle formed between the first axis and a third axis that is based on a third optical axis of the camera at the third viewpoint with reference to the first position, the first orientation, the third position, and the third orientation, and when the third angle is smaller than the first angle or when the fourth position and the fourth orientation cannot be calculated, outputting a notification that movement of the camera is inappropriate.

15. A computer program product comprising a non-transitory computer-readable medium including instructions that, when executed by a computer, cause the computer to perform:
controlling taking a first image of an object from a first viewpoint using a camera;
controlling taking a second image of the object after the camera moves to a second viewpoint different from the first viewpoint;
calculating, using the first image and the second image, a first position and a first orientation of the camera at the first viewpoint;
calculating a second position and a second orientation of the camera at the second viewpoint;
calculating, with reference to the first position, the first orientation, the second position, and the second orientation, a first axis based on a first optical axis of the camera at the first viewpoint, a second axis based on a second optical axis of the camera at the second viewpoint, and a first angle formed between the first axis and the second axis, the first optical axis and the second optical axis passing through an optical center of the camera;
calculating, using the first axis, the second axis, and the first angle, a next viewpoint at which next imaging is to be performed and which is positioned in a direction of increase of the first angle, by rotating the second axis with reference to an intersection point of the first axis and the second axis, before an image is taken at the next viewpoint; and
outputting information prompting movement of the camera in a direction of the next viewpoint from the second viewpoint, wherein the instructions further cause the computer to perform;
controlling taking a third image of the object from a third viewpoint,
calculating a third position and a third orientation of the camera at the third viewpoint using the first image and the third image,
calculating a fourth position and a fourth orientation of the camera at the third viewpoint using the second image and the third image,
calculating a third angle formed between the first axis and a third axis that is based on a third optical axis of the camera at the third viewpoint with reference to the first position, the first orientation, the third position, and the third orientation, and
when the third angle is smaller than the first angle or when the fourth position and the fourth orientation cannot be calculated, the outputting a notification that movement of the camera is inappropriate.

* * * * *